Figures 1, 2:
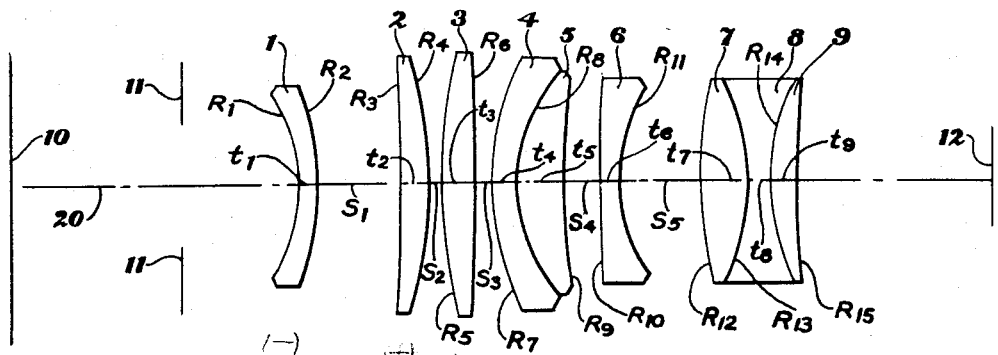

Oct. 14, 1958   W. E. SCHADE   2,855,824
LARGE APERTURE LENS FOR LENTICULAR FILM PHOTOGRAPHY
Filed Feb. 18, 1957

| EF = 100 mm. | | | | f/2.3 |
|---|---|---|---|---|
| Lens | N | V | Radii | Thicknesses |
| 1 | 1.5725 | 42.5 | $R_1 = -50.72$ mm. | $t_1 = 5.48$ mm. |
|   |   |   | $R_2 = -79.84$ | $S_1 = 25.24$ |
| 2 | 1.7450 | 46.4 | $R_3 = -519.8$ | $t_2 = 8.28$ |
|   |   |   | $R_4 = -110.8$ | $S_2 = 2.74$ |
| 3 | 1.6384 | 55.5 | $R_5 = +168.2$ | $t_3 = 9.86$ |
|   |   |   | $R_6 = -765.9$ | $S_3 = 4.96$ |
| 4 | 1.6170 | 38.5 | $R_7 = +82.2$ | $t_4 = 6.85$ |
| 5 | 1.6384 | 55.5 | $R_8 = +46.46$ | $t_5 = 13.69$ |
|   |   |   | $R_9 = +204.5$ | $S_4 = 11.20$ |
| 6 | 1.7174 | 29.5 | $R_{10} = +571.0$ | $t_6 = 5.10$ |
|   |   |   | $R_{11} = +49.50$ | $S_5 = 23.83$ |
| 7 | 1.6968 | 56.2 | $R_{12} = +114.0$ | $t_7 = 15.24$ |
| 8 | 1.5256 | 54.6 | $R_{13} = -58.53$ | $t_8 = 5.24$ |
| 9 | 1.7551 | 47.2 | $R_{14} = +64.92$ | $t_9 = 8.31$ |
|   |   |   | $R_{15} = +254.0$ |   |

Willy E. Schade
INVENTOR.

BY Daniel S. Mayne
Harold F. Bennett
ATTORNEY & AGENT

_United States Patent Office_ 2,855,824
Patented Oct. 14, 1958

2,855,824

LARGE APERTURE LENS FOR LENTICULAR FILM PHOTOGRAPHY

Willy E. Schade, Rochester, N. Y., assignor to Eastman Kodak Company, Rochester, N. Y., a corporation of New Jersey Application February 18, 1957, Serial No. 640,682

3 Claims. (Cl. 88—57)

This invention relates to optical objectives and particularly to objectives for use in color photography and color television and in converting from one to the other.

The object of the invention is to provide a telecentric photographic objective corrected for an aperture stop in the front principal focal plane and having a large aperture, that is, larger than $f/2.8$.

U. S. Patents Nos. 1,685,600 and 1,749,278 to Frederick are more or less typical of the known art in lenticular film color photography. The optical principles involved broadly in this type of color photography are explained in the earlier Frederick patent. This process involves providing a banded color filter in front of the taking objective and a lenticular film for separating the color images on the sensitized surface and then projecting the pictures through a projection objective which is provided with a banded color filter corresponding in apparent size and apparent position to the filter used in the taking lens so that the light rays projected through the lenticular film traverse a band of the same color as the corresponding rays traversed when taking the picture. In the Frederick patents the color filter was placed close to the projection lens for convenience, and since the taking lens is usually of a shorter focal length, the corresponding filter had to be farther in front of the taking objective.

There are certain unique advantages in a telecentric system in which the banded color filter appears to be at infinity as viewed from the lenticular film and acts as the aperture stop of the system. The most obvious advantage is that objectives of different focal lengths are readily interchangeable and as long as the banded filter is at the front focal point of each objective, it will appear to be at infinity as viewed from the film plane and thus will be in the correct position for taking pictures for projection through any projection objective having the same arrangement. Another advantage lies in the fact that the image-forming pencil of rays is perpendicular to the lenticular film surface at all points of the image. By this is meant that it is perpendicular to the surface as a whole, not to the particular point of incidence on the curve of one lenticule. The advantage of this is that a sheet of lenticular film may be moved about in the focal plane and still project a properly colored image so long as the lentitcules are parallel to the color bands, whereas the arrangement shown by Frederick in which the banded filter appears at a finite distance requires the sheet of lenticular film to be centered at the same point on the axis both in taking and in projecting. This is because the principal rays slope downward on one side of the axis and upward on the other so that, if a point to one side of the axis is moved to the axial position, the elemental color images are in the wrong position relative to the lenticule for proper projection. Fig. 3 of the later Frederick patent should clarify this distinction.

A still further advantage of the telecentric arrangement in which the banded filter is at the front focal plane and acts as the aperture stop of the system and so appears at infinity when viewed from the film position is that the image-forming cones of rays on all portions of the film area have the same aperture angle (unless vignetted). The avoidance of vignetting is of much more importance in color photography than in black-and-white photography because any decrease in the lens aperture at points off the axis cuts down on a color band at the edge of the banded filter but does not cut down on the central band and thus the color balance is destroyed.

A more recent development is color television in which one of various equivalents to the banded filter is used in place of a banded filter. These equivalents usually involve some coordination of the scanning spot with a filter system which may change from one color to another in synchronism with the scanning cycle. However, such systems are not within the scope of the present invention and in general are optically equivalent to the older photographic process described in the Frederick patents and elsewhere. However, there is one difference which may be mentioned and that is that, in kinescope recording of television, it is more common to operate at finite conjugates whereas in color photography from original subjects, that is, from nature, it is more common to operate with a large object distance approaching infinity, although of course printers are also used which operate at finite conjugates.

According to the present invention, a telecentric objective is provided which is highly corrected for use at a relative aperture of $f/2.8$ or greater and with the aperture stop in the front focal plane and which is suitable for recording color television on lenticular film or for color photography with banded filters. It is made up of a front negative component on the long conjugate side, a positive member spaced therebehind by between 0.15 F and 0.4 F where F is the equivalent focal length of the objective, a negative component spaced therebehind by between 0.05 F and 0.3 F and finally a compound positive rear component spaced between 0.1 F and 0.35 F behind the rear negative component and between 0.2 F and 0.6 F in front of the principal focal point. In this description the words "element," "component," and "member" are used with the conventional meanings as set forth for example in U. S. Patent 2,012,-822, Lee. The front negative component has a dioptric power between $-0.2$ P and $-0.6$ P where P is the power of the objective as a whole. The positive member spaced therebehind has a dioptric power between $+1.2$ P and $+1.7$ P and comprises a plurality of positive components of which at least one is compounded for achromatizing. The second negative component follows this positive member and has a dioptric power between $-1.1$ P and $-1.7$ P. The rear positive component has a dioptric power between $+0.75$ P and $+1.2$ P and is compounded for improving the Petzval sum. Preferably it is a cemented triplet with a negative element made of low-index light flint glass cemented between two positive elements having refractive indices greater on the average than 1.7, the index of the negative element being at least 0.15 lower than the average of the indices of the two positive elements. The powers of the several members as above indicated are computed as the sums of surface powers neglecting thicknesses.

The refractive indices and dispersive indices of the elements and the choice of components to be made compound for achromatizing the system is largely based on the following considerations: It is well known that lenses of positive power are achromatized by combining a negative element or elements of flint glass with a positive element or elements of crown glass. The words "flint" and "crown" have come to be used rather loosely to denote glass types of relatively high and relatively low dispersions regardless of composition, although originally they referred more strictly to lead silicate glasses and ordinary silicate glasses. In the following description they will be used in the broader sense. The correction of the Petzval sum of a lens system may be accomplished in two ways or by a combination of both. The first way is by combining a high-index crown glass with a low-index flint glass and the second is by separating the elements by air spaces so that the beams of light which pass through the positive components converge and are constricted to a smaller diameter when they come to the negative components so that the negative elements are made stronger while still having no greater effect on the focal length and thus contribute more negative Petzval sum. In the present instance, since it is required to place the aperture stop in front of the system and at the front focal point of the system, it is not practicable to completely correct the Petzval sum by spacing the positive and negative components apart because lengthening the system permits the oblique rays passing through the aperture stop to spread out too far from the axis during their journey through the lens and thereby requires too great a diameter of the lens elements. Accordingly, I found it preferable to correct the Petzval sum to a large extent by using high-index positive elements and low-index negative elements wherever practicable. This again runs into difficulties, as is well known, because the general run of ordinary glasses runs from low-index crown glasses with refractive indices N of 1.5 to 1.6 or 1.62 and dispersive indices of 60 or 65 to high-index flint glasses at the other end of the range with indices N of 1.7 or 1.75 and dispersive indices of 28 or 30. In addition to these ordinary glasses, there are a number of heavy element glasses which range from about 1.69/56 to about 1.80/42 now available commercially which are very advantageous in correcting the Petzval sum and achromatizing at the same time. As regards the choice of which component to achromatize by, one has to balance the axial achromatism with the oblique or lateral achromatism, the components near the front of the objective having a relatively greater effect on the axial color in this case and those near the back of the objective having a relatively greater effect on the lateral color because the principal ray is farther from the axis (relatively to the aberration ray) at the back end of the lens than at the front end near the stop, and as is well known, the achromatizing effect increases as the distance of the ray from the axis increases. In designing a specific embodiment of the invention, I was able to achromatize the system by making the rear component of the front positive member in the form of a doublet of two glasses of approximately equal refractive index. This so-called buried surface is convenient because it permits achromatizing without disturbing the monochromatic aberrations of the system during the design thereof. I then made up the rearmost component of high-index positive elements and a low-index negative element all with roughly the same dispersive indices so that I could vary the Petzval sum during design without any great effect on the color correction of the system. I made up the second negative component of a very high dispersion flint glass to aid in color correction and with a high refractive index to benefit the zonal aberrations.

The front negative component is useful along with the rear positive component for controlling the Petzval sum by the choice of a low refractive index and optionally by compounding it of a high refractive index positive element with a low refractive index negative element.

In regard to the shapes of the several members, the two negative components are preferably meniscus and convex toward the front positive member therebetween, the front positive member is preferably weak at its front and rear surfaces, the radii of these surfaces preferably being greater than ±3 F and between +F and infinity respectively, and with at least four-fifths of the power of this member contributed by the interior glass-air surfaces. The rear positive member is preferably convex to the front and with the radius of curvature of its rear surface between +F and infinity.

In the accompanying drawing:

Fig. 1 shows in diagrammatic axial section an objective according to the invention.

Fig. 2 gives specifications for one specific embodiment of the invention.

Fig. 1 shows an objective consisting of lens elements 1 to 9 axially aligned on an axis 20 and with an aperture stop 11 at the front principal focal plane of the system. The objective is corrected for conjugate planes 10 and 12, the object plane 10 being actually six or eight times farther away from the aperture stop than is shown. The magnification for which the system was designed is 3.8 to 1. The front negative component consists of a single element 1, the positive member consists of two singlets 2 and 3 and a cemented doublet of elements 4 and 5. The second negative component comprises a single element 6 while the rear positive component comprises three elements 7, 8 and 9.

Fig. 2 gives constructional data for a specific embodiment of the invention having a focal length of 100 mm. and a relative aperture of $f/2.3$. This table is repeated herewith for convenience.

[EF=100 mm.   $f/2.3$.]

| Lens | N | V | Radii, mm. | Thicknesses, mm. |
|---|---|---|---|---|
| 1 | 1.5725 | 42.5 | $R_1 = -50.72$ | $t_1 = 5.48$ |
|   |        |      | $R_2 = -79.84$ | $s_1 = 25.24$ |
| 2 | 1.7450 | 46.4 | $R_3 = -519.8$ |  |
|   |        |      | $R_4 = -110.8$ | $t_2 = 8.28$ |
|   |        |      |                | $s_2 = 2.74$ |
| 3 | 1.6384 | 55.5 | $R_5 = +168.2$ | $t_3 = 9.86$ |
|   |        |      | $R_6 = -765.9$ | $s_3 = 4.96$ |
| 4 | 1.6170 | 38.5 | $R_7 = +82.2$ | $t_4 = 6.85$ |
|   |        |      | $R_8 = +46.46$ |  |
| 5 | 1.6384 | 55.5 | $R_9 = +204.5$ | $t_5 = 13.69$ |
|   |        |      |                | $s_4 = 11.20$ |
| 6 | 1.7174 | 29.5 | $R_{10} = +571.0$ | $t_6 = 5.10$ |
|   |        |      | $R_{11} = +49.50$ |  |
|   |        |      |                   | $s_5 = 23.83$ |
| 7 | 1.6968 | 56.2 | $R_{12} = +114.0$ | $t_7 = 15.24$ |
|   |        |      | $R_{13} = -58.53$ |  |
| 8 | 1.5256 | 54.6 | $R_{14} = +64.92$ | $t_8 = 5.24$ |
| 9 | 1.7551 | 47.2 | $R_{15} = +254.0$ | $t_9 = 8.31$ |

In this table as in the drawing the lens elements are numbered in the first column in order from front to rear, the refractive indices N for the "D" line of the spectrum and the conventional dispersive indices V are given in the next two columns, and the radii of curvature R of the lens surfaces, the thicknesses $t$ and the spaces $s$ between components each numbered by subscripts from front to rear are given in the last two columns. The plus and minus signs associated with the values of the radii R designate surfaces respectively convex and concave toward the front. This example is corrected for use in the deep violet and ultraviolet range of the spectrum.

This example embodies all the features of the invention as above set forth. The powers of the four members in order from front to rear are −0.41 P, +1.48 P, −1.32 P and +0.96 P. The other features of the invention are directly evident in the table.

This objective has been made up and found highly satisfactory for the purpose for which it was intended. There are further modifications which I contemplate but which I have not had time to work out in detail. For example, the lens would be slightly less expensive to manufacture if the second and third elements, which are very similar, were made out of the same kind of glass and with the same radii and thicknesses (but turned oppositely, as they are in Fig. 1). A suitable glass would be a heavy element glass, 1.697/56.2, made by the Eastman Kodak Co., which is roughly an average between the two glasses used in these elements in the example. This arrangement is especially advantageous when a large number of lenses are to be made up. Also, an improvement in the secondary color correction could be made by using a short flint glass such as Schott KzF-3 or KzF-6 in the low-index negative elements, particularly in element 8, but since the lens is satisfactory for the required use this refinement was not found necessary at this time. Moreover, by suitable modification, the system can be adapted for use in the visible spectrum or for infinite object distance or both. In designing such modifications, I contemplate substituting a glass with a somewhat different index in any element in the system as the specific conditions of use require and concurrently modifying the radii to restore the corrections, and I consider such variations to be within the scope of my invention.

With these and other modifications in mind, the most highly preferred form of my invention comprises an objective made up of nine elements, as shown, in which the dioptric power of each component, the radius of curvature of its front surface and the refractive index of each lens element is within the limits set forth in the following table:

$$0.2\ P < -P_1 < 0.6\ P$$
$$0.4\ F < -R_1 < 0.6\ F$$
$$0.3\ P < P_2 < 0.75\ P$$
$$-\frac{0.7}{F} < \frac{1}{R_3} < +\frac{0.3}{F}$$
$$0.25\ P < P_3 < 0.65\ P$$
$$F < +R_5 < 5\ F$$
$$0.35\ P < (P_4 + P_5) < 0.8\ P$$
$$0.6\ F < +R_7 < 1.3\ F$$
$$1.1\ P < -P_6 < 1.7\ P$$
$$-\frac{0.3}{F} < \frac{1}{R_{10}} < \frac{0.7}{F}$$
$$0.75\ P < (P_7 + P_8 + P_9) < 1.2\ P$$
$$0.7\ F < R_{12} < 2\ F$$
$$1.54 < N_1 < 1.60$$
$$1.60 < N_2 < 1.78$$
$$1.60 < N_3 < 1.78$$
$$1.55 < N_4 < 1.70$$
$$-0.04 < (N_5 - N_4) < +0.04$$
$$1.62 < N_6 < 1.78$$
$$1.60 < N_7 < 1.78$$
$$1.50 < N_8 < 1.55$$
$$1.64 < N_9 < 1.82$$

In this table the powers of the respective elements are designated by "P" with a subscript corresponding to the number of the element as given in the drawing and the powers of the compound components are given as the sums of the powers of the individual elements therein. These powers are computed as the sums of the individual surface powers without regard to the thicknesses. The curvatures of the cemented surfaces and hence the powers of the individual elements and also the dispersive indices of the several glasses are determined by the requirements of color correction in known manner. The radii $R_3$ and $R_{10}$ of the third and tenth surfaces are defined by their reciprocals because the preferred range extends through zero in these cases, that is the surface may be either convex or concave or plane. The front surfaces of the other components are defined by the radii themselves in the more customary manner.

I claim:

1. A telecentric objective highly corrected for use at a relative aperture of $f/2.8$ or greater and with the aperture stop substantially at the front principal focal plane of the system, consisting of a front negative meniscus component convex toward the rear and with a dioptric power between $-0.2\ P$ and $-0.6\ P$ where P is the power of the system as a whole, a positive member spaced therebehind by between $0.15\ F$ and $0.4\ F$ where F is the focal length of the system as a whole and comprising a plurality of positive components with at least four-fifths of the power of the member contributed by the interior glass-air surfaces, the total power of the member being between $+1.2\ P$ and $+1.7\ P$, a negative meniscus component convex to the front and spaced therebehind by between $0.05\ F$ and $0.3\ F$ and having a power between $-1.1\ P$ and $-1.7\ P$, and a rear compound positive component spaced between $0.1\ F$ and $0.35\ F$ behind the second negative component and between $0.2\ F$ and $0.6\ F$ in front of the principal focal point of the system, the rear component having a power between $+0.75\ P$ and $+1.2\ P$ and being made up of at least one negative element and at least one positive element, the average refractive index of its positive elements being higher than 1.7 and that of its negative elements being at least 0.15 lower than that of its positive elements, the powers of the individual members being taken as the sum of the surface powers neglecting the thicknesses.

2. A telecentric objective as claimed in claim 1 in which the rear component is a cemented triplet consisting of a biconcave negative element between two positive elements, and in which the front positive member consists of three components of which the rear one is compound.

3. A telecentric objective consisting of six components, the first, second, third and fifth being single elements, the fourth being a cemented doublet and the sixth being a cemented triplet, the objective being highly corrected for chromatic and monochromatic abberations in a preselected spectral range, in which the powers of the several components set forth as sums of the powers P of the individual elements, the radii of curvature R of the front surface of the several components and the refractive indices N of the several lens elements are within the limits set forth in the following table:

$$0.2\ P < -P_1 < 0.6\ P$$
$$0.4\ F < -R_1 < 0.6\ F$$
$$0.3\ P < P_2 < 0.75\ P$$
$$-\frac{0.7}{F} < \frac{1}{R_3} < +\frac{0.3}{F}$$
$$0.25\ P < P_3 < 0.65\ P$$
$$F < +R_5 < 5\ F$$
$$0.35\ P < (P_4 + P_5) < 0.8\ P$$
$$0.6\ F < +R_7 < 1.3\ F$$
$$1.1\ P < -P_6 < 1.7\ P$$
$$-\frac{0.3}{F} < \frac{1}{R_{10}} < \frac{0.7}{F}$$
$$0.75\ P < (P_7 + P_8 + P_9) < 1.2\ P$$
$$0.7\ F < R_{12} < 2\ F$$
$$1.54 < N_1 < 1.60$$
$$1.60 < N_2 < 1.78$$

$$1.60 < N_3 < 1.78$$
$$1.55 < N_4 < 1.70$$
$$-0.04 < (N_5 - N_4) < +0.04$$
$$1.62 < N_6 < 1.78$$
$$1.60 < N_7 < 1.78$$
$$1.50 < N_8 < 1.55$$
$$1.64 < N_9 < 1.82$$

wherein F is the focal length and P the power of the objective as a whole and wherein the powers P and refractive indices N of the lens elements and the radii of curvature R of the lens surfaces are each numbered by subscripts in order from the front to the rear of the objective, and in which the thickness of each lens element is between 0.04 F and 0.2 F and the spaces between adjacent components are between 0.15 F and 0.35 F in the case of the front and rear spaces and between 0.01 F and 0.10 F in the case of the remaining spaces.

References Cited in the file of this patent

UNITED STATES PATENTS

| | | |
|---|---|---|
| 2,600,805 | Reiss | June 17, 1952 |

FOREIGN PATENTS

| | | |
|---|---|---|
| 168,923 | Great Britain | Sept. 12, 1921 |
| 551,635 | France | Jan. 11, 1923 |
| 890,722 | Germany | Sept. 21, 1953 |
| 891,469 | Germany | Sept. 28, 1953 |